United States Patent Office 2,973,976
Patented Mar. 7, 1961

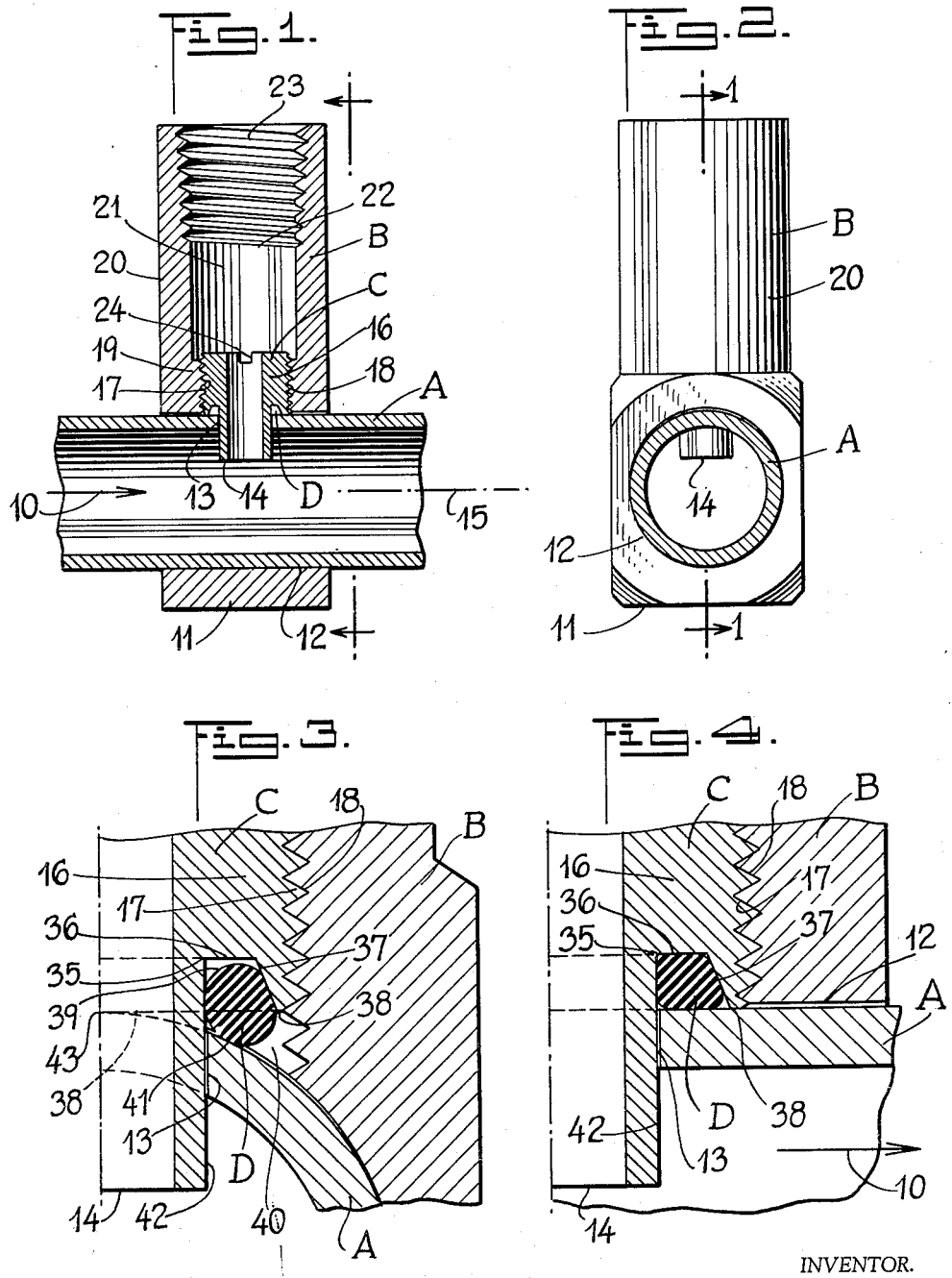

2,973,976

NOZZLE MOUNTING ADAPTER FOR IN LINE PIPE AND TUBE INSTALLATIONS

William F. Steinen, Short Hills, N.J.
(% Wm. Steinen Mfg. Co., 43 Bruen St., Newark, N.J.)

Filed Aug. 19, 1957, Ser. No. 678,815

1 Claim. (Cl. 285—197)

The present invention relates to nozzle mounting adapters for in line pipe and tube installations, and it particularly relates to circle adapter right angle flow fittings for in line mounting for nozzles.

The present invention will be particularly described in its application to the location of a plurality of nozzles, particularly water nozzles, for commercial and agricultural spraying procedures, and it particularly relates to an arrangement by means of which nozzle fittings may be arranged either in line or in other manners.

It is among the objects of the present invention to provide a simple, reliable in line nozzle mounting adapter which may be readily applied to tubing arrangements and which will permit watertight junctions to be made along the run of tubing or piping, as the case may be.

Another object is to provide simple, durable nozzle mounting adapters, readily applied to tubes and pipes, which will permit ready mounting of nozzles thereon, preferably in a line arrangement.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

It has been found most satisfactory according to one embodiment of the present invention to provide a basic fitting for engagement with a tube or pipe having an eye therein and a threaded outlet for connection with a nozzle or other side connection, which at the same time will have an interior nipple projecting into the tube or piping and at the same time forming a liquid-tight or watertight junction therewith.

It has been found that in forming these in line connections and in attaining the desired seals, it is important that the seal be made as close as possible to the inlet or connection into the interior of the tubing or piping, and that such seal be achieved by compressing a circular gasket element against the tubing or pipe as closely adjacent the opening thereof as possible.

The circular seal, which is desirably a synthetic rubber ring of circular cross-section, generally terminating in an O-ring, should be compressed from its circular cross-section into square or trapezoidal cross-section, without, however, completely filling the recess or cup in which it is placed and without engagement with any of the threads.

It has been found that where the O-ring is crushed together or is forced into engagement with threading, it tends to lock the junction in position and frequently prevents ready dislodgement or re-opening of the fittings and also prevents ready repair and replacement of the various junction connecters or adapters and nozzles.

It has been found that the maximum sealing effect is achieved where the major angle of compression of the O-ring or similar gasket is obliquely toward the central axis without being parallel to the central axis.

It has been particularly found that the gasket should not be compressed outwardly or squeezed outwardly, since this results in difficulties of the sealing effect.

Desirably to lessen the total squeezing effect, a stopping means should be provided to give a face to face metal contact and thus limit maximum compression of the gasket and prevent it from being over-compressed or squeezed out into the entire cavity in which it is placed.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:

Fig. 1 is a side sectional view of a typical mounting adapter according to the present invention taken upon the line 1—1 of Fig. 2.

Fig. 2 is an end elevational view upon the line 2—2 of Fig. 1.

Fig. 3 is a fragmentary transverse sectional view upon an enlarged scale as compared to Figs. 1 and 2, showing the position of the gasket after it is tightened into position.

Fig. 4 is a view of the gasket in compressed condition similar to Fig. 3, showing the maximum compression which is possible, with the section being at an angle of 90° to that shown in Fig. 3.

Referring to Figs. 1 to 4, there is shown the run of tubing or piping A upon which the adapters are mounted.

The adapter itself, which may carry the nozzle or other branch connection, is indicated at B.

The sealing nipple C, which is positioned within the adapter B, carries the sealing gasket D.

Referring to Figs. 1, 3 and 4, the liquid may be flowing along the pipe in the direction indicated by the arrow 10.

The adapter B has an enlarged head 11 which may be a rectangular cross-section, as shown in Fig. 2.

The head 11 is provided with a circular opening or eye 12 through which the tubing or piping is inserted.

The opening 12 will have a slightly larger diameter than the piping A and will permit the piping A to be inserted in the eye or opening 12 with a slight clearance.

The pipe or tubing A will previously have been provided with a series of aligned radial openings or holes 13 to receive the nipples C which project inwardly in the interior of the pipe or tubing A but which terminate substantially short of the central axis, as indicated at 15 in Fig. 1.

The nipple C has a cylindrical extension 14 and is provided with an enlarged base or threaded portion 16 which has a machine thread 17 and is threaded into the threaded portion 18 of the reduced diameter portion 19 of the outwardly extending portion 20 of the adapter B.

The chamber 21 will be provided above the base 16 of the nipple C, which chamber will extend to the end 22 of the pipe threaded outlet portion 23 of the element B. The pipe threaded outlet portion 23 may carry a side branch connection or a nozzle, as the case may be.

The present invention is particularly directed to the sealing arrangement provided in connection with the nipple C.

Adjacent the base of the inwardly projecting extension 14 is an annular groove 35 having three walls, one of which is cylindrically aligned with the outer wall 42 of the cylindrical extension 14, the second of which has an oblique outer wall 37 extending upwardly from the radial shoulder of the enlarged portion of nipple C and the third of which is a radially extending bottom wall joining the first and second walls (see particularly Figs. 3 and 4).

This contact is indicated by the dotted line 38 in Fig. 3 which indicates the line of the stop edge 38.

O-ring D when originally inserted is placed around the nipple extension 14 and is forced down into the outer compression of the groove 35, where it will wedge itself, as indicated in Fig. 3, with there being a bottom space 39 and an adapter space 40 when the original contact with the pipe is achieved at 41 in Fig. 3, slightly outside of but closely adjacent the wall 42 of the nipple extension 14 (see Fig. 3).

The first compression will convert the O-ring D from a circular cross-section to an elliptical cross-section, as indicated by the solid lines in Fig. 3.

The maximum force will be exerted by the oblique wedging face 37, which tends to press the O-ring or gasket D obliquely inwardly toward the face 42 and toward the opening 13 around the nipple extension 14.

As the nipple C is tightened downwardly by the fillister slot 24, the gasket D will be compressed, forcing itself downwardly to fill up the space 39 in the lower part of the groove 35 and also being flatened outwardly so that it will substantially fill the space or cross-section of the grove 35, without, however, overflowing the groove, even without passing the contact edge 38.

The contact edge 38, if it hits the side face 43 of the pipe, as indicated in Fig. 3, will still leave sufficient space inside of the grove 35 so that the O-ring D will not have been completely compressed and will still have room for slight expansion.

It will be noted that, as a result, the O-ring D, in its compressed condition shown in Fig. 4, will have a trapezoidal cross-section with the compression being toward the opening 13 and against the wall 42 of the nipple 14 and not outwardly past the groove or recess 35.

Particularly it will be noted that the compression of the gasket D will have been away from the screw threads 17 and 18 and it will not engage or contact such screw threads with likelihood of locking the connections permanently in position.

The wedging effect is obliquely inwardly toward the central axis of the nipple 14 and toward the center of the piping A, with the result that the sealing will be toward the opening 13 where it is most effective. Moreover, the O-ring will not be squeezed into any thin section, but will more or less retain its trapezoidal shape, as shown in Fig. 4, and may readily return to its O cross-section when pressure is relieved, as shown in Fig. 3.

Otherwise, a portion of the gasket D would be squeezed to thin cross-section and ruptured against the threads 17 and 18, and would be permanently damaged so that new O-rings would have to be utilized upon each adjujstment, re-arrangement or remantling of the in line nozzle arrangement.

By reason of this arrangement it is possible to use shorter stem connections 14 which give less obstruction to the flow of water in the direction 10 and which will not penetrate as far into the interior of the tube or pipe A.

It will be noted that it is the cavity in the stem nipple C which provides the compression effect as well as the recess for the compressible gasket D. The gasket at no time enters into the space outside of the contact edge 38 of the nipple C.

The stop edge 38 is particularly of value in limiting the compression and in preventing flow out of the circular recess which receives the gasket D.

Moreover, a uniform sealing is achieved throughout the length of the piping.

The present arrangement presents a most convenient arrangement of circular adapter right angle flow fittings for in line mounting for nozzles, and it also provides a particularly satisfactory nozzle mounting adapter arrangement for in line pipe and adapter installations.

The outlets of nozzles may be arranged circularly or spirally along the length of the tubing or piping A, but they are preferably arranged in line to achieve the best results.

As many changes could be made in the above nozzle mounting adapter for in line pipe and tube installations, and many widely different embodiments of this invention could be made without departure from the scope of the claim, it is intended that all matter contained in the above description shall be interpreted as illustrative and not in a limiting sense.

Having now particularly described and ascertained the nature of the invention, and in what manner the same is to be performed, what is claimed is:

A nozzle mounting adapter, assembly for use with cylindrical tubing having a radial hole in the side thereof, comprising an adapter element having an eye to receive said tubing, said adapter element having a tubular connection with two interior threaded portions, a first threaded portion being adjacent to the said eye and a second threaded portion being adjacent to the outer end thereof and a tubular nipple having a cylindrical extension adapted to be received in the hole in the tubing, said extension having an outside diameter substantially equal to the diameter of the hole in the tubing, said nipple having an enlarged externally threaded portion adapted to cooperate with said first threaded portion of said tubular connection, the bottom of said enlarged portion forming a radial shoulder, an annular groove in said radial shoulder of said enlarged portion, said groove having three walls, a first wall being cylindrical and aligned with the outer wall of said extension, a second oblique outer wall converging upwardly from said radial shoulder, a third radially extending bottom wall joining the upper ends of said first and second walls, a gasket normally circular in cross-section and having an internal diameter no greater than the diameter of said first wall, the cross-sectional area of said gasket being substantially equal to but no greater than the cross-sectional area of said grove whereby in operative position on said tubing the gasket will sealingly engage throughout its annular extent the outer surface of the tubing, said first cylindrical wall and said oblique wall without any portion of the gasket being in contact with the threads of the first threaded portion of said adapter, said radial shoulder between said grove and said enlarged portion beign tangential to the outer wall of said tubing.

References Cited in the file of this patent

UNITED STATES PATENTS

| | | |
|---|---|---|
| 1,178,234 | Hayden | Apr. 4, 1916 |
| 2,286,566 | Norton | June 16, 1942 |
| 2,373,253 | Martin | Apr. 10, 1945 |
| 2,488,064 | Mueller | Nov. 15, 1949 |
| 2,520,092 | Frederickson | Aug. 22, 1950 |
| 2,537,249 | Walton | Jan. 9, 1951 |
| 2,618,511 | Wahlin | Nov. 18, 1952 |

FOREIGN PATENTS

| | | |
|---|---|---|
| 268,923 | Great Britain | Apr. 14, 1927 |
| 793,236 | France | Nov. 16, 1935 |